(12) United States Patent
Kishibata et al.

(10) Patent No.: US 7,149,620 B2
(45) Date of Patent: Dec. 12, 2006

(54) CONTROL DEVICE FOR ENGINE DRIVEN VEHICLE INCORPORATING GENERATOR

(75) Inventors: Kazuyoshi Kishibata, Numazu (JP); Yuichi Kitagawa, Numazu (JP); Hiroyasu Sato, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 238 days.

(21) Appl. No.: 10/820,603

(22) Filed: Apr. 8, 2004

(65) Prior Publication Data

US 2004/0201219 A1 Oct. 14, 2004

(30) Foreign Application Priority Data

Apr. 10, 2003 (JP) ............................. 2003-106758

(51) Int. Cl.
*F02D 31/00* (2006.01)
(52) U.S. Cl. ...................... 701/110; 123/350
(58) Field of Classification Search ................ 701/102, 701/103, 115, 101, 110; 73/116; 123/319, 123/333, 335, 350; 290/40 C, 51; 903/930, 903/940, 941, 942; 477/3; 180/65.4, 65.2
See application file for complete search history.

(56) References Cited

U.S. PATENT DOCUMENTS 6,493,611 B1 * 12/2002 Yoshino et al. ............... 701/22

FOREIGN PATENT DOCUMENTS

JP 2001-231106 8/2001

* cited by examiner

*Primary Examiner*—Andrew M. Dolinar
*Assistant Examiner*—Johnny H. Hoang
(74) *Attorney, Agent, or Firm*—Pearne & Gordon LLP (57) ABSTRACT

A control device for controlling an engine driven vehicle that drives a generator by an engine to supply power to an external load when the vehicle is stopped, including: rotational speed limiting means for controlling to limit a rotational speed of the engine to a limit rotational speed or lower corresponding to an upper limit value accepted while driving when the vehicle is driven, and to limit the rotational speed of the engine to a limit rotational speed or lower corresponding to a rotational speed slightly higher than an upper limit value of the rotational speed required for supplying power from the generator to the external load when the vehicle is stopped to supply power from the generator to the external load.

3 Claims, 4 Drawing Sheets

CONTROL DEVICE FOR ENGINE DRIVEN VEHICLE INCORPORATING GENERATOR

TECHNICAL FIELD OF THE INVENTION

The present invention relates to a control device for an engine driven vehicle that drives a generator by an engine when the vehicle is stopped and supplies power from the generator to an external load.

BACKGROUND OF THE INVENTION

Engine driven vehicles are known, which drive a generator by an engine when driving is stopped to supply power to an external load. Such a vehicle is disclosed, for example, in Japanese Patent Laid-Open No. 2001-231106.

In recent years, in engine driven vehicles such as ATVs (All Terrain Vehicles, so-called buggies), tractors, or recreation vehicles that are designed for driving on rough ground, a commercial AC output of AC 100 V or AC 200 V (50 Hz or 60 Hz) has been supplied from a power supply unit that uses a generator driven by an engine as a power supply to an external load in a separate system from electrical components of the vehicle such as an ignition device, a fuel injection device, a head light, or a direction indicator, when the vehicle is stopped.

As a generator to be a power supply of the power supply unit, a generator provided separately from a generator that drives electrical components of a vehicle is sometimes used, or a generator that drives electrical components of a vehicle is sometimes shared.

A power supply unit incorporated in such a vehicle has a construction suitable for a generator mounted to an engine. For example, when a magneto AC generator that cannot perform field control is used as a generator mounted to the engine, a power supply unit is comprised of a rectifier that rectifies an output of the generator, an inverter that converts an output of the rectifier into an AC output at a commercial frequency, and a filter that removes harmonic components from the output of the inverter.

When a synchronous generator that can perform field control is used as a generator mounted to the engine, a power supply unit is comprised of the generator, and a circuit that controls a field of the generator.

A control device for the engine driven vehicle incorporating such a power supply unit includes: engine control means (ECU) that performs various controls required for operating the engine when the vehicle is driven and the generator is driven; a mode selection switch for selecting a control mode between a control mode for driving vehicle and a control mode for generating electric power; and generation control means for arithmetically operating a target rotational speed of the engine required for supplying predetermined power from the power supply unit to a load, or for controlling a circuit such as an inverter provided in the power supply unit, when the mode selection switch selects the control mode for generating electric power.

The engine control device is comprised so as to perform control of an ignition timing and a fuel injection amount (when an injector is used as fuel supply means) of the engine, idling control for stabilizing idling of the engine, control for matching a rotational speed of the engine with the target rotational speed provided from the generation control means when the control mode for generating electric power is selected, control for limiting the rotational speed to a limit rotational speed or lower in order to prevent damage to the engine, in accordance with control conditions such as the rotational speed of the engine, a throttle valve opening degree, an engine temperature, a gear position of a transmission provided between the engine and wheels, or the like. Generally, the limit rotational speed of the engine is set equal to a mechanical limit speed of the engine.

In the vehicle having the generator for driving the external load as described above, if a gear position of a power transmission device provided between a crankshaft of the engine and driving wheels is in a position for transmitting power (a position other than a neutral position or a parking position) in error when the generator is driven, an increase in the rotational speed of the engine for driving the generator may cause runaway of the vehicle.

Thus, the generation control means is comprised so as to control to rotate the engine at a desired rotational speed only when the mode selection switch selects the control mode for generating electric power, and a gear position sensor detects that the gear position of the power transmission device is in an N (neutral) position or a P (parking) position.

Japanese Patent Laid-Open No. 2001-231106 describes that a rotational speed is controlled by generation control means only when a gear position sensor detects that a gear position of a power transmission device is in a position for cutting power transmission.

The generation control means has a construction suitable for a construction of a generator. For example, when a magneto AC generator is used as a generator, the generation control means is comprised of target rotational speed arithmetic operation means for arithmetically operating a target rotational speed of the engine required for generating a predetermined output from the inverter, and inverter control means for controlling the inverter so as to output an AC voltage at a predetermined frequency from the inverter The target rotational speed arithmetically operated by the generation control means is provided to the engine control means. The engine control means controls an output control device of the engine so that a deviation becomes zero between the current rotational speed of the engine and the target rotational speed provided from the generation control means, and controls the engine to keep the rotational speed at the target rotational speed.

When a synchronous generator that can perform field control constitutes the power supply unit, a main unit of the generation control means is comprised of means for providing a target rotational speed (a fixed value) of the engine required for keeping an output frequency of the synchronous generator at a predetermined commercial frequency to the engine control means, and field current control means for controlling a field current of the generator so as to keep an output voltage of the synchronous generator within a set range.

The engine control means is comprised of an electronic control unit (ECU) including a microprocessor, an ignition device, an injector drive circuit, or the like.

The generation control means is constructed using the microprocessor of the ECU or a microprocessor dedicated for the generation control means.

The output control device of the engine is a device operated for adjusting the rotational speed of the engine, and a valve that is operated by an actuator to adjust an intake air amount of the engine is used as the device. As the valve that adjusts the intake air amount of the engine, an electronically controlled throttle valve, as well as an ISC valve (Idle Speed Control Valve) or an IAC valve (Idle Air Control valve) that adjusts the amount of bypassing air passing so as to bypass the throttle valve may be used.

As described above, the ECU provided in the engine control device controls to limit the rotational speed of the engine to the limit rotational speed or lower. In the conventional control device, the limit rotational speed of the engine is equally set in the driving time control mode and in the control mode for generating electric power, and therefore, operating an axle allows the rotational speed of the engine to increase to a high limit rotational speed in the driving time control mode even in the control mode for generating electric power.

In the driving time control mode, providing a switch between an output terminal of the generator and a circuit closer to a load than the output terminal of the generator and opening the switch, or the like may prevent problems that an excessive voltage is applied to the circuit closer to the load than the generator (for example, a rectifier or an inverter) to damage circuit components, when the rotational speed of the engine increases to increase the output voltage of the generator.

However, in the control mode for generating electric power, the output voltage of the generator is necessarily in a state of application to the circuit closer to the load, and therefore an excessive increase in the rotational speed of the engine may cause damage to electronic components of the circuit closer to the load.

When the engine is controlled in the control mode for generating electric power, the engine output control device is generally controlled so that the generation control means keeps the rotational speed of the engine at the target rotational speed, which prevents an excessive increase in the rotational speed of the engine to cause disadvantages as described above. However, when a driver operates an axle in error to open the throttle valve during generation, or when an abnormality occurs in the engine output control device, the rotational speed of the engine may increase to exceed the target rotational speed. In this case, the ECU accepts the increase in the rotational speed of the engine up to the limit rotational speed set to an upper limit value of the rotational speed of the engine accepted while vehicle driving, which may cause damage to the components of the circuit closer to the load than the generator.

SUMMARY OF THE INVENTION

Therefore, an object of the invention is to provide a control device for an engine driven vehicle that prevents damage to components of a circuit connected to a generator when a throttle valve is opened in error while an engine is driven in a control mode for generating electric power, or when an abnormality occurs in an engine output control device to excessively increase a rotational speed of the engine.

The invention is directed to a control device for an engine driven vehicle including an engine provided for driving a vehicle body, and a generator driven by the engine, and is comprised so as to supply power from the generator to an external load when driving is stopped.

In order to achieve the above described object, rotational speed limiting means is provided for limiting a rotational speed of the engine so as to limit the rotational speed of the engine to a limit rotational speed or lower corresponding to an upper limit value accepted while driving when the vehicle is driven, and to limit the rotational speed of the engine to a limit rotational speed or lower corresponding to a rotational speed slightly higher than an upper limit value of the rotational speed required for supplying power from the generator to the external load when the vehicle is stopped to supply power from the generator to the external load.

Providing such rotational speed limiting means allows the rotational speed when the power is supplied from the generator to the external load to be limited to a speed or lower suitable for protecting a circuit connected to the generator. Thus, when a throttle valve is opened by a human during generation to cause an increase in the rotational speed of the engine, the rotational speed is prevented from excessively increasing to damage the circuit connected to the generator.

According to a preferable aspect of the invention, in addition to the rotational speed limiting means, error occurrence time engine stop means is provided for stopping the engine when an error occurs that requires limiting the rotational speed of the generator.

According to another preferable aspect of the invention, the rotational speed limiting means is comprised so as to limit the rotational speed of the engine to an upper limit value or lower accepted while driving when the vehicle is driven, to limit the rotational speed of the engine to a rotational speed or lower slightly higher than an upper limit value of the rotational speed required for supplying power from the generator to the external load when the vehicle is stopped to supply power from the generator to the external load, and to limit the rotational speed of the engine to an upper limit value or lower of the rotational speed accepted at the occurrence of an error when an error occurs that requires limiting the rotational speed of the generator.

As described above, comprising the control device so as to stop the engine, or to limit the rotational speed of the engine to the upper limit value or lower of the rotational speed accepted at the occurrence of the error when the error occurs that requires limiting the rotational speed of the generator prevents the generator from being driven with the error occurring to damage the circuit connected to the generator.

The engine driven vehicle to which the invention is applied generally includes: an engine incorporated in a vehicle body having driving wheels with a crankshaft connected to the driving wheels via a power transmission device; a power supply unit that has a generator driven by the engine and uses the generator as a power supply to supply power to an external load; engine control means for performing control required for driving the engine, control for keeping the rotational speed of the engine to a target rotational speed, and control for limiting the rotational speed of the engine to a set limit rotational speed or lower; a mode selection switch for selecting a control mode between a control mode for driving vehicle and a control mode for generating electric power; and generation control means for controlling the power supply unit and determining the target rotational speed of the engine so as to generate a predetermined output from the power supply unit when the mode selection switch selects the control mode for generating electric power, wherein when the mode selection switch selects the driving time control mode, the control mode is set to the driving time control mode to perform control required for driving the vehicle, and when the vehicle is stopped and the mode selection switch selects the control mode for generating electric power, the control mode is set to the control mode for generating electric power to perform control required for supplying power from the power supply unit to the external load. When the invention is applied to the control device having such a construction, limit rotational speed switching means is provided for switching a limit rotational speed in accordance with the control mode so that when the control mode is the driving time control mode, the limit rotational speed is set to a rotational speed corresponding to an upper limit value of the rotational speed of the engine accepted while vehicle driving, and when the control mode is the control mode for generating electric power, the limit rotational speed is set to a rotational speed slightly higher than an upper limit value of the rotational speed required for supplying power from the power supply unit to the external load.

When rotational speed limit control is performed for limiting the rotational speed of the engine at the occurrence of an error, there are provided error detection means for detecting as an error an abnormal condition that requires limiting the rotational speed of the generator; and limit rotational speed switching means for switching a limit rotational speed so that when the control mode is the driving time control mode, the limit rotational speed is set to a rotational speed corresponding to an upper limit value of the rotational speed of the engine accepted while vehicle driving, when the control mode is the control mode for generating electric power, the limit rotational speed is set to a rotational speed slightly higher than an upper limit value of the rotational speed required for supplying power from the power supply unit to the external load, and when the error detection means detects an error with the mode selection switch selecting the control mode for generating electric power, the limit rotational speed is set to a rotational speed sufficiently lower than the limit rotational speed in the control mode for generating electric power or set to zero.

When the error detection means is provided as described above, there may be provided limit rotational speed switching means for switching a limit rotational speed so that when the control mode is the driving time control mode, the limit rotational speed is set to a rotational speed corresponding to an upper limit value of the rotational speed of the engine accepted while vehicle driving, and when the control mode is the control mode for generating electric power, the limit rotational speed is set to a rotational speed slightly higher than an upper limit value of the rotational speed required for supplying power from the power supply unit to the external load; and error occurrence time engine stop means for stopping the engine when the error detection means detects an error with the mode selection switch selecting the control mode for generating electric power.

BRIEF DESCRIPTION OF THE DRAWINGS

The above and other objects and features of the present invention will be apparent from the detailed description of the preferred embodiments of the invention, which is described and illustrated with reference to the accompanying drawings, in which.

DETAILED DESCRIPTION OF THE PREFERRED EMBODIMENTS

Now, embodiments of the invention will be described with reference to the drawings.

An engine driven vehicle to which the invention is applied may be an ATV (a buggy), a tractor, a recreational vehicle, or the like, that incorporates a power supply unit that uses a generator mounted to an engine for driving the vehicle as a power supply to generate an AC power at a commercial frequency, and use, a structure, and a type of the vehicle are arbitrary.

Figure 1:
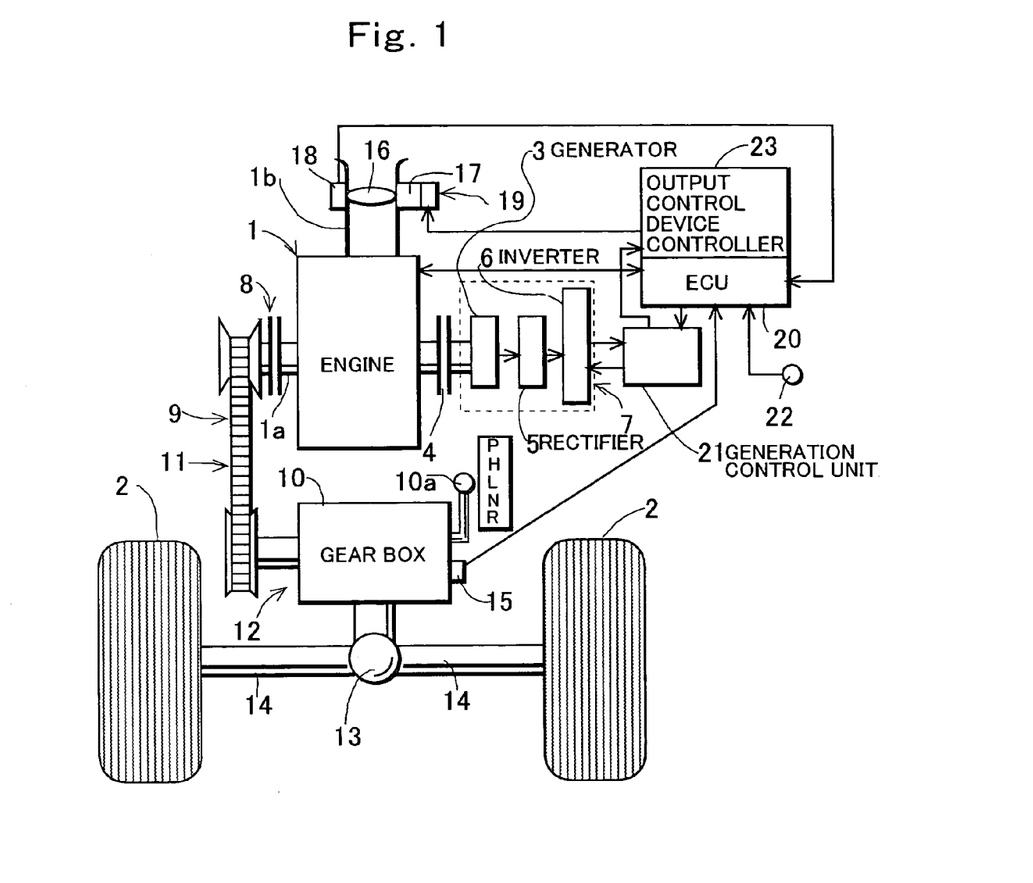
FIG. 1 is a schematic diagram of a construction of a vehicle to which a control device according to an embodiment of the invention is applied.
Figure 2:
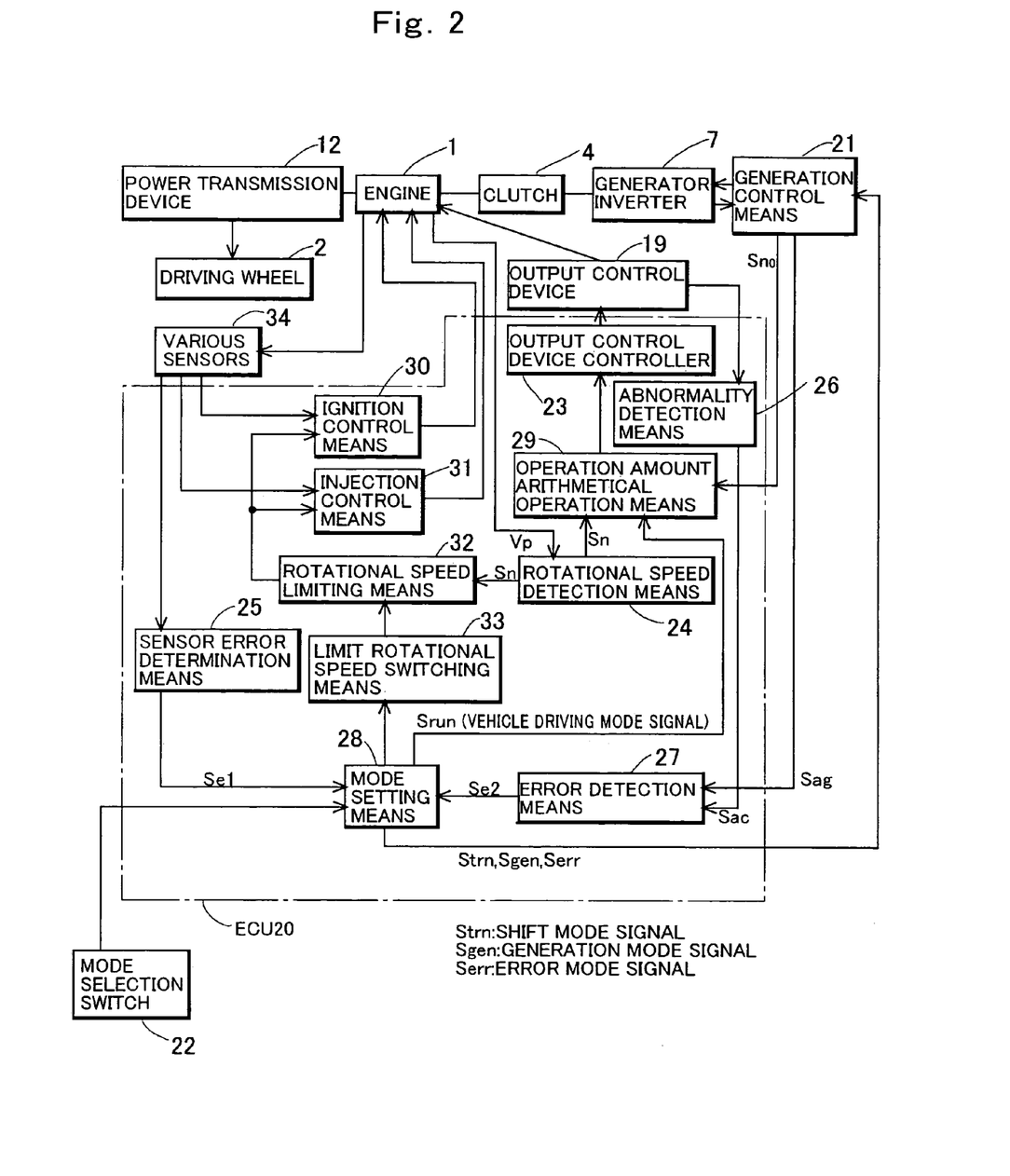
FIG. 2 is a block diagram of a whole construction of the embodiment of the invention.

FIG. 1 shows an example of a whole construction of the engine driven vehicle to which the invention is applied, and FIG. 2 is a block diagram of a whole construction of the embodiment of the invention. In FIG. 1, a reference numeral 1 denotes an engine incorporated in a vehicle body (not shown) having driving wheels 2, a reference numeral 3 denotes a magneto AC generator that is incorporated in the vehicle body together with the engine 1 and whose rotor has a rotation axis connected to an end of a crankshaft 1a of the engine via a clutch 4, a reference numeral 5 denotes a rectifier that converts an AC output of the generator 3 into a DC output, a reference numeral 6 denotes an inverter that converts the DC output of the rectifier into an AC output at a commercial frequency of AC 100 V or AC 200 V, and a power supply unit 7 is comprised of the generator 3, the rectifier 5, and the inverter 6.

The other end of the crankshaft 1a of the engine is connected to an axle 14 to which the vehicle driving wheels 2 are mounted via a power transmission device 12 including a centrifugal clutch 8, and a CVT (continuously variable transmission) 11 having a belt transmission mechanism 9 and a gear box 10, and a gear mechanism 13.

A gear position selection lever 10a is mounted to the gear box 10, and the lever is operated to switch a gear position to a parking position P, a high position H, a low position L, a neutral position N, or a reverse (backing up) position R. A gear position sensor 15 that detects the gear position is mounted to the gear box 10. Among the gear positions, the neutral position N and the parking position P are positions for cutting power transmission from the engine to the driving wheels, and the high position H, the low position L, and the reverse (backing up) position R are positions for transmitting power from the engine to the driving wheels.

A throttle valve 16 is mounted to an intake pipe 1b of the engine, and an output shaft of an electric actuator 17 is connected to an operation shaft of the throttle valve. An input shaft of a throttle sensor 18 that generates an electric signal proportional to an opening degree of the throttle valve is also connected to the operation shaft of the throttle valve 16. In this embodiment, the throttle valve 16 and the actuator 17 that operates the throttle valve are used as output control devices 19 that adjust an intake valve amount in order to control an output of the engine.

An unshown injector (an electromagnetic fuel injection valve) is mounted to the intake pipe 1b of the engine 1, and an ignition plug is mounted to a cylinder head of the engine.

A reference numeral 20 denotes an electronic control unit (ECU) that constitutes engine control means, a reference numeral 21 denotes generation control means, and an output of the gear position sensor 15 and an output of the throttle sensor 18 are input to the ECU 20. A mode selection switch 22 for selecting a control mode between a driving time control mode and a control mode for generating electric power is provided, and a signal provided from the mode selection switch is input to the ECU 20.

The ECU 20 includes a microprocessor, an ignition circuit, and an injector drive circuit, or the like as a unit, and causes the microprocessor to execute a predetermined program to constitute the engine control means for performing control of an ignition timing, control of an fuel injection amount, control required for operating the engine such as idling control, control for matching a rotational speed of the engine with a target rotational speed provided from the generation control means in the control mode for generating electric power, and control for limiting the rotational speed of the engine to a limit rotational speed or lower.

In the shown example, the ECU 20 includes an output control device controller 23 for controlling an output control device of the engine. The controller 23 controls the output control device for controlling the output of the engine to control the rotational speed of the engine.

The output control device controller 23 is used for controlling idling of the engine (idling control), and also used for controlling to rotate the engine at a rotational speed required for generating a predetermined output from the power supply unit 7.

In this example, the throttle valve 16 is operated by the actuator 17, and thus an operation of changing an opening degree of the throttle valve in accordance with an axle operation by a driver is performed using the output control device controller 23 to construct a so-called electronic control throttle.

As an output control device used for electronically controlling the rotational speed of the engine, an ISC valve (Idle Speed Control valve) or an IAC valve (Idle Air Control valve) that adjusts the amount of bypassing air passing so as to bypass the throttle valve may be used. In this case, the engine may be comprised so as to mechanically adjust the opening degree of the throttle valve 16 in accordance with the axle operation by the driver.

Though not shown, in the embodiment, a magneto generator for driving electric components loads always driven by the engine is mounted to the engine 1 besides the generator 3, and power is supplied from the magneto generator via a predetermined power supply circuit to electric components required to be driven for operating the engine (such as the ECU, the injector, or a fuel pump for feeding fuel to the injector).

A signal generator (not shown) that generates a pulse signal at a predetermined crank angle position of the engine is mounted to the engine 1, and an output of the signal generator is provided to the ECU 20. The microprocessor in the ECU 20 measures a generation interval of pulses generated at a fixed crank angle position by the signal generator to calculate the rotational speed of the engine. The microprocessor obtains crank angle information of the engine from the output pulses of the signal generator, and detects an ignition timing or a start timing of fuel injection.

In this example, separately from the microprocessor in the ECU, a microprocessor that constitutes the generation control means 21 is provided, and executes a predetermined program to construct various control means required for performing control in the control mode for generating electric power.

FIG. 2 shows a block diagram of a whole construction of the control device according to the embodiment. In the example in FIG. 2, besides the output control device controller 23, the engine control means constituted by the ECU 20 includes rotational speed detection means 24, sensor error determination means 25, abnormality detection means 26, error detection means 27, mode setting means 28, operation amount arithmetical operation means 29, ignition control means 30, injection control means 31, rotational speed limiting means 32, and limit rotational speed switching means 33.

Various sensors 34 are provided that detect various control conditions used for controlling an ignition timing and a fuel injection amount. The various sensors 34 include sensor groups that detect a cooling water temperature of the engine, an intake air temperature, atmospheric pressure, or the like.

More specifically, the rotational speed detection means 24 is means for detecting the rotational speed of the engine, arithmetically operates the rotational speed of the engine from a generation interval of pulses $V_p$ (a time required for the crankshaft of the engine to rotate through a certain angle) generated at a predetermined crank angle position by the signal generator (not shown) mounted to the engine 1, and provides a rotational speed detection signal $S_n$ including information on the arithmetically operated rotational speed to the operation amount arithmetical operation means 29 and the rotational speed limiting means 32. The rotational speed detection means 24 is comprised of a timer that measures the generation interval of the pulses $V_p$, and rotational speed arithmetical operation means for arithmetically operating the rotational speed from a measurement value of the timer.

The sensor error determination means 25 is means for determining whether no error occurs in the various sensors 34, and determines that an error occurs in a sensor when a signal from the sensor is stopped, or when an output signal of the sensor is abnormally loud, to provide an error detection signal $S_{e1}$ to the mode setting means 28.

The abnormality detection means 26 is means for detecting an abnormality that occurs in the output control device 19, and provides a control device abnormality detection signal $S_{ac}$ to the error detection means 27 when abnormal conditions occur such that the throttle valve does not move even after the actuator 17 that constitutes the output control device 19 is driven (a condition where the throttle valve is damaged and locked), or that an overcurrent passes through the actuator 17 (a condition where a drive coil is short-circuited when the actuator is constituted by a solenoid, and a condition where a motor is locked when the actuator is constituted by the motor).

In this example, the generation control means 21 provides a power supply unit abnormality detection signal $S_{ag}$ to the error detection means 27 when the generation control means 21 detects abnormal conditions of the power supply unit 7 such as an abnormal temperature increase of a coil of the generator, an abnormal temperature increase of a semiconductor switch element that constitutes an inverter, a failure of the semiconductor switch element that constitutes the inverter, a condition where an overcurrent continuously passes through the inverter, occurrence of electrical leakage, or the like.

The error detection means 27 is means for determining whether an abnormality occurs in the output control device and/or the power supply unit, and determines that an abnormality occurs in the output control device 19 and/or the power supply unit 7 when the abnormality detection signal $S_{ac}$ and/or the abnormality detection signal $S_{ag}$ is provided to provide an error detection signal $S_{e2}$ to the mode setting means 28.

In this example, the sensor error determination means 25, the abnormality detection means 26, and the error detection means 27 constitute error detection means for detecting that an error occurs in a system comprised of the engine, the generator, and the control device for controlling them when an abnormal condition is detected that requires limiting the rotational speed of the engine to a sufficiently low limit rotational speed or lower, or stopping the engine.

In the embodiment, control in the control mode for generating electric power is allowed only when the gear position of the power transmission device 12 is in the parking position in order to prevent runaway of the vehicle when the engine is driven in the control mode for generating electric power. Thus, though not shown in FIG. 2, the error detection means is preferably comprised so that when the mode selection switch 22 selects the control mode for generating electric power, a condition where the gear position of the power transmission device 12 is not in the parking position is determined as an abnormal condition, and this abnormal condition is detected as an error.

The mode setting means 28 is means for setting the control mode in accordance with a signal provided from the mode selection switch 22 and error detection signals $S_{e1}$ and $S_{e2}$, and comprised so as to perform the following processing.

(a) When the mode selection switch selects the driving time control mode, the mode setting means 28 sets the control mode to the driving time control mode, provides a vehicle driving mode signal $S_{run}$ to the operation amount arithmetical operation means, and provides a limit rotational speed switch signal to the limit rotational speed switching means.

(b) When the mode selection switch selects the control mode for generating electric power, and the error detection means detects no error, the mode setting means 28 sets the control mode to a shift mode for performing control in a process of shifting to the control mode for generating electric power, provides a shift mode signal $S_{trn}$ to the generation control means 21, and provides the limit rotational speed switch signal to the limit rotational speed switching means.

(c) When completion of the shift mode is confirmed, the mode setting means 28 sets the control mode to the control mode for generating electric power, provides a generation mode signal $S_{gen}$ to the generation control means 21, and provides the limit rotational speed switch signal to the limit rotational speed switching means 33.

(d) When an error is detected with the mode selection switch selecting the control mode for generating electric power, the mode setting means 28 sets the control mode to an error mode, provides an error mode signal $S_{err}$ to the generation control means 21, and provides the limit rotational speed switch signal to the limit rotational speed switching means.

The operation amount arithmetical operation means 29 is means for arithmetically operating an operation amount of the output control device required for matching an intake air amount of the engine with a target value. A signal $S_{no}$ indicating a target rotational speed of the engine provided from the generation control means 21, a rotational speed detection signal $S_n$ provided from the rotational speed detection means 24, and a vehicle driving mode signal $S_{run}$ provided from the mode setting means 28 are input to the operation amount arithmetical operation means 29.

When the vehicle driving mode signal $S_{run}$ is provided, the operation amount arithmetical operation means 29 arithmetically operates an operation amount of the output control device 19 required for a deviation to be zero between the current rotational speed of the engine provided from the rotational speed detection signal $S_n$ and a preset idling speed, and provides the arithmetically operated operation amount to the output control device controller 23. The output control device controller 23 operates the output control device 19 by the provided operation amount, and adjusts the intake air amount of the engine so as to match the rotational speed of the engine with the idling speed.

When the shift mode signal $S_{trn}$, the generation mode signal $S_{gen}$, and the error mode signal $S_{err}$ are provided to the generation control means 21, the operation amount arithmetical operation means 29 arithmetically operates an operation amount of the output control device 19 required for a deviation to be zero between the target rotational speed signal $S_{no}$ provided from the generation control means 21 and the rotational speed detection signal $S_n$, and provides the arithmetically operated operation amount to the output control device controller 23. The output control device controller 23 operates the output control device 19 by the provided operation amount, and adjusts the intake air amount of the engine so as to match the rotational speed of the engine with the target rotational speed $S_{no}$.

The target rotational speed provided to the operation amount arithmetical operation means 29 by the generation control means 21 takes on a value required in each of the control modes: the shift mode; the control mode for generating electric power; and the error mode.

Specifically, in the shift mode, the target rotational speed is set equal to an initial rotational speed in the control mode for generating electric power. When the power supply unit includes the inverter as in the embodiment, the initial rotational speed is set to a rotational speed lower than a rotational speed when a nominal output is generated from the inverter. When a synchronous generator that can perform field control constitutes the power supply unit, the initial rotational speed is set to a rotational speed required for obtaining a predetermined output frequency (50 Hz or 60 Hz).

In the control mode for generating electric power, the target rotational speed provided from the generation control means is set to a value required for generating a predetermined output from the power supply unit. When the power supply unit includes the inverter, the target rotational speed is changed depending on sizes of the load so as to take on a value required for supplying predetermined power to the load.

In the error mode, the target rotational speed is set equally to the limit rotational speed in the error mode (for example, the idling speed).

The ignition control means 30 is means for controlling ignition of the engine, and is comprised of a known ignition circuit that generates a high voltage for ignition when an ignition signal is provided, ignition timing arithmetical operation means for arithmetically operating an ignition timing of the engine in accordance with control conditions detected by the various sensors 34, and ignition signal generation means for generating an ignition signal to be provided to the ignition circuit when the arithmetically operated ignition timing is detected.

The injector control means 31 is means for controlling an amount of fuel (a fuel injection amount) injected from an injector (an electromagnetic fuel injection valve) that supplies fuel to the engine, and is comprised of an injector drive circuit that supplies a drive current to the injector when an injection instruction signal is provided, injection amount arithmetical operation means for arithmetically operating the fuel injection amount in accordance with the control conditions detected by the various sensors 34, and injection instruction signal generation means for providing an injection instruction signal to the injector drive circuit when a predetermined injection start timing is detected. The injection instruction signal is constituted by a rectangular waveform signal having a signal width required for injecting the fuel of the arithmetically operated injection amount, and the fuel is injected from the injector while the injection instruction signal is generated.

The rotational speed limiting means 32 is means for controlling to limit the rotational speed of the engine to a set limit rotational speed or lower (controlling to restrain overspeed). The rotational speed limiting means is comprised so as to control the ignition control means 30 to perform ignition timing delay, ignition spark thinning, or ignition cut-out until the rotational speed provided from the rotational speed detection means 24 becomes equal to the limit rotational speed, to control the injection control means 31 to stop the fuel injection until the rotational speed provided from the rotational speed detection means 24 becomes equal to the limit rotational speed, or to cut out fuel injection into part of multiple cylinders until the rotational speed becomes equal to the limit rotational speed (perform so-called cylinder reduction injection control), thereby controlling to limit the rotational speed of the engine to the set limit rotational speed or lower.

The limit rotational speed switching means 33 is means for switching the limit rotational speed in rotational speed limit control in accordance with the control mode set by the mode setting means 28. Specifically, the limit rotational speed switching means 33 is comprised so as to switch the limit rotational speed in accordance with the control mode set by the mode setting means 28 so that when the mode setting means 28 sets the control mode to the driving time control mode, the limit rotational speed is set to a rotational speed corresponding to an upper limit value of the rotational speed of the engine accepted while vehicle driving, when the mode setting means 28 sets the control mode to the shift mode, the limit rotational speed is set to a rotational speed slightly higher than an initial rotational speed in the control mode for generating electric power, when the mode setting means 28 sets the control mode to the control mode for generating electric power, the limit rotational speed is set to a mechanically allowable maximum rotational speed or lower of the generator and a rotational speed slightly higher than an upper limit value of the rotational speed of the generator required in the control mode for generating electric power (the rotational speed slightly higher than the upper limit value of the rotational speed required in the control mode for generating electric power), and when the mode setting means 28 sets the control mode to the error mode, the limit rotational speed is set to a rotational speed sufficiently lower than the limit rotational speed in the control mode for generating electric power or set to zero in order to stop the engine.

Though not shown in FIG. 2, the generation control means 21 includes shift mode processing means for providing the initial rotational speed in the control mode for generating electric power to the engine control means as the target rotational speed when the mode setting means 28 sets the control mode to the shift mode to cause the engine control means to increase the rotational speed of the engine to the initial rotational speed, and shift completion condition determination processing means for determining whether a shift completion condition is met required for allowing the control mode to be shifted to the control mode for generating electric power, and the shift mode processing means and the shift completion condition determination processing means constitute the shift mode control means.

In the embodiment, the mode setting means 28, the limit rotational speed switching means 33, and the rotational speed limiting means 32 constitute the rotational speed limiting means for controlling to limit the rotational speed of the engine 1 to the limit rotational speed or lower corresponding to the upper limit value accepted while driving when the vehicle is driven, to limit the rotational speed of the engine to the limit rotational speed or lower corresponding to the rotational speed slightly higher than the upper limit value of the rotational speed required for supplying power from the generator to the external load, and to limit the rotational speed of the engine to the limit rotational speed or lower corresponding to the upper limit value of the rotational speed accepted at the occurrence of the error when the error occurs that requires limiting the rotational speed of the generator.

Figure 3:
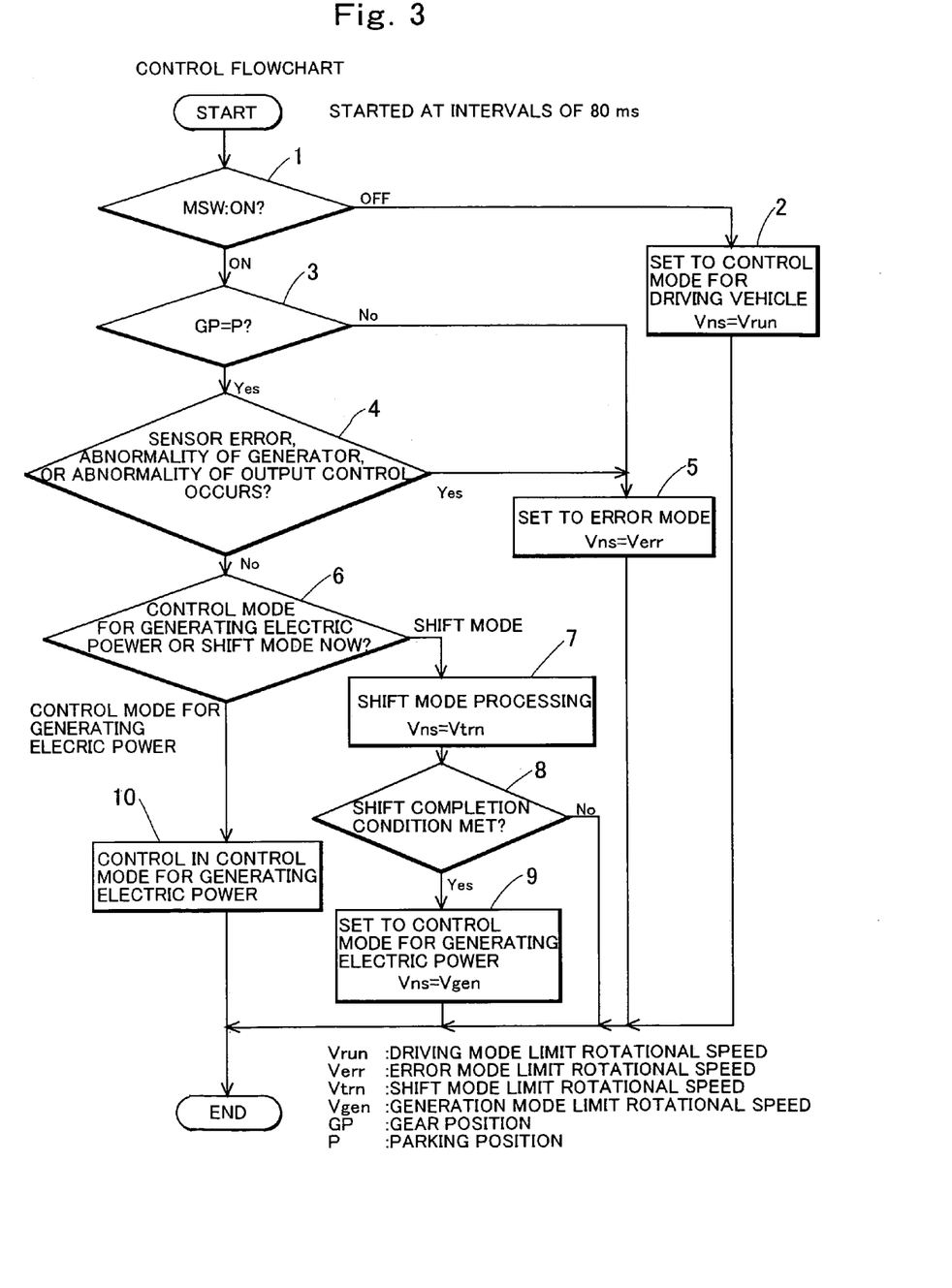
FIG. 3 is a flowchart of an example of an algorithm of essential portions of a program executed by a microprocessor in the embodiment of the invention.

FIG. 3 is a flowchart of an example of an algorithm of a task executed by the microprocessor of the ECU 20 in order to construct the mode setting means 28 and the limit rotational speed switching means 33 of the control device shown in FIG. 2.

The task shown in FIG. 3 is executed at intervals of 80 msec when the engine rotates, and according to the algorithm, in Step 1, it is determined whether a mode selection switch (MSW) is in an on state (whether the control mode for generating electric power is selected). When it is determined that the mode selection switch is not in the on state (when it is determine that the vehicle driving mode is selected), the process goes to Step 2, the control mode is set to the driving time control mode to provide the vehicle driving mode signal $S_{run}$ to the operation amount arithmetical operation means 29, and the limit rotational speed $V_{ns}$ in the rotational speed limit control is set to the limit rotational speed $V_{run}$ in the driving time control mode to finish the task. The limit rotational speed in the driving time control mode is the upper limit value of the rotational speed of the engine accepted while vehicle driving, and generally set to a mechanical limit speed of the engine.

When it is determined in Step 1 that the mode selection switch is in the on state (when it is determined that the control mode for generating electric power is selected), the process goes to Step 3, and it is determined whether the gear position GP is in the parking position P. When it is determined that the gear position is in the parking position P, the process goes to Step 4, and it is determined whether any of occurrence of a sensor error, an abnormality of the generator, and an abnormality of the output control device is detected. When an error or an abnormality is detected, the process goes to Step 2, it is determined that the current control mode is the error mode to generate the error mode signal $S_{err}$, the limit rotational speed $V_{ns}$ in the rotational speed limit control is set to the sufficiently low value $V_{err}$ suitable for the error mode, and then the clutch 4 is turned off to finish the task. The limit rotational speed $V_{err}$ in the error mode is generally set to an idling speed or a minimum rotational speed close to the idling speed, or to zero in order to stop the engine.

When it is determined in Step 3 that the gear position is not in the parking position, the process goes to Step 5, the control mode is set to the error mode to generate the error mode signal $S_{err}$, and the limit rotational speed $V_{ns}$ is set to the value $V_{err}$ in the error mode, and then the clutch 4 is turned off to finish the task.

The condition where it is determined in Step 3 that the gear position is not in the parking position though the control mode for generating electric power is selected is an abnormality that requires limiting the rotational speed of the generator (engine) or stopping the driving like the sensor error, the abnormality of the generator, or the abnormality of the output control device. In the embodiment, the error detection means for detecting as an error the abnormality that requires limiting the rotational speed of the generator is constructed by Steps 3 and 4 in FIG. 3.

In Step 4, when it is determined that no error or abnormality is detected, the process goes to Step 6, and it is determined whether the current control mode is the control mode for generating electric power or the shift mode. When it is determined that the control mode is the shift mode, the process goes to Step 7 to perform processings in the shift mode. In the shift mode, a processing of setting the limit rotational speed $V_{ns}$ to the limit rotational speed $V_{trn}$ in the shift mode and a processing of turning on the clutch 4 are performed.

The limit rotational speed in the shift mode is set to a rotational speed slightly higher than the initial rotational speed in the control mode for generating electric power, and when the power supply unit 7 includes the inverter as in the embodiment, the limit rotational speed is set to a rotational speed lower than the rotational speed when the power supply unit 7 generates a nominal output.

When a synchronous generator that can perform field control is used as the generator that constitutes the power supply unit, the limit rotational speed in the shift mode is set to a speed slightly higher than the rotational speed required for generating an output voltage at a predetermined output frequency (50 Hz or 60 Hz) from the synchronous generator.

Then, in Step 8, it is determined whether the shift completion condition is met. The shift completion condition is a condition required to be met when the control mode is shifted to the control mode for generating electric power. The shift completion condition includes conditions such that the rotational speed of the engine reaches the initial rotational speed, that the power transmission device is in the state of cutting power transmission, and that the output voltage of the power supply unit reaches an initial value, and the shift to the control mode for generating electric power is allowed only when these conditions are met.

When the gear position sensor is faulty and it is determined in Step 3 that the gear position is in the parking position though not therein, or when a transmission or an automatic clutch mechanism is faulty and the power of the engine is in a state of being transmitted to the driving wheels though the gear position is in the parking position, it is necessary to determine whether the power transmission device is in the state of cutting power transmission while controlling in the shift mode in order to prevent a start of the control mode for generating electric power to start the vehicle while stopping.

Whether the power transmission device is in the state of cutting power transmission can be determined by, for example, gradually increasing the rotational speed at first in a process of increasing the rotational speed of the engine toward the initial rotational speed at the start of the shift mode, and checking whether a vehicle speed sensor or the like detects movement of the vehicle when the rotational speed reaches a power transmission start rotational speed of an automatic clutch mechanism.

Specifically, when the movement of the vehicle is detected at the time when the rotational speed slightly exceeds the power transmission start rotational speed in the process of gradually increasing the rotational speed of the engine, it can be determined that the power transmission mechanism is in the state of power transmission, and when the movement of the vehicle is not detected even after the rotational speed exceeds the power transmission start rotational speed to some extent, it can be determined that the power transmission mechanism is not in the state of power transmission.

A value may be detected, as a determination value, that reflects a load on the engine when the throttle valve is opened through a set opening degree within a range that prevents runaway of the vehicle, after the rotational speed of the engine reaches the power transmission start rotational speed in the process of gradually increasing the rotational speed of the engine, and it may be determined whether the power transmission device is in the state of cutting power transmission from the determination value.

As the value that reflects the load of the engine, an increasing ratio of the rotational speed of the engine to the change of the throttle valve opening degree, or an increasing ratio or an increasing amount of pressure in the intake pipe to the change of the throttle valve opening degree.

When it is determined in Step 8 that the shift completion condition is not met, no processing is performed thereafter to finish the task. When it is determined in Step 8 that the shift completion condition is met, the process goes to Step 9, the control mode is set to the control mode for generating electric power, and the limit rotational speed $V_{ns}$ in the rotational speed limit control is set to the limit value $V_{gen}$ in the control mode for generating electric power to finish the task.

In Step 6, when it is determined that the current control mode is the control mode for generating electric power, the process goes to Step 10 to finish the task with the control in the control mode for generating electric power continued (with the generation mode signal $S_{gen}$ generated).

Operations when the above described control device is provided in the engine driven vehicle in FIG. 1 will be described below.

When the mode selection switch 22 selects the control mode for driving vehicle, the output control device 19 is operated in accordance with the axle operation by the driver to control the rotational speed of the engine 1 to be suitable for vehicle driving.

When the gear position sensor 10 detects that the gear position is in the parking position P and the error detection means detects no error, with the mode selection switch 22 selecting the control mode for generating electric power, the control in the shift mode is performed to turn on the clutch 4 and to increase the rotational speed of the engine toward the initial rotational speed in the control mode for generating electric power.

When it is confirmed that the rotational speed of the generator reaches the initial rotational speed in the control mode for generating electric power, that the power transmission device is in the state of cutting power transmission, and that the output voltage of the power supply unit reaches the initial value, and it is determined that the shift completion condition is met, the control in the control mode for generating electric power is started to control the rotational speed of the engine so that predetermined power is supplied from the power supply unit to the load.

When the error detection means detects the occurrence of an error, the control mode is shifted to the error mode, the rotational speed of the engine is limited to a limit value in the error mode (the idling speed in the embodiment) or the engine is stopped to prevent driving of the generator with the error occurring and turn off the clutch 4.

In this way, by the process of turning off the clutch 4 in the error mode, error occurrence time clutch off means is constructed for turning off the clutch when an error occurs that requires stopping driving of the generator.

In the above described embodiment, the clutch 4 is inserted between the crankshaft of the engine and the rotational axis of the generator 3. Providing the clutch 4 so as to be turned off 4 while vehicle driving and turned on during generation allows the generator to be disengaged from the engine while vehicle driving, and therefore when the mechanical limit speed of the generator 3 is lower than the upper limit value of the rotational speed of the engine accepted while vehicle driving, damage to the generator can be prevented caused by the rotational speed of the generator exceeding the limit value while vehicle driving.

However, the invention is not limited to such a construction. For example, when there is no possibility of mechanical damage to the generator even if the rotational speed of the generator 3 is increased to the rotational speed corresponding the upper limit value of the rotational speed of the engine accepted while vehicle driving, and an excessive increase in the output voltage of the generator while vehicle driving may be simply prevented, the control device may be constructed as shown in FIG. 4.

Figure 4:
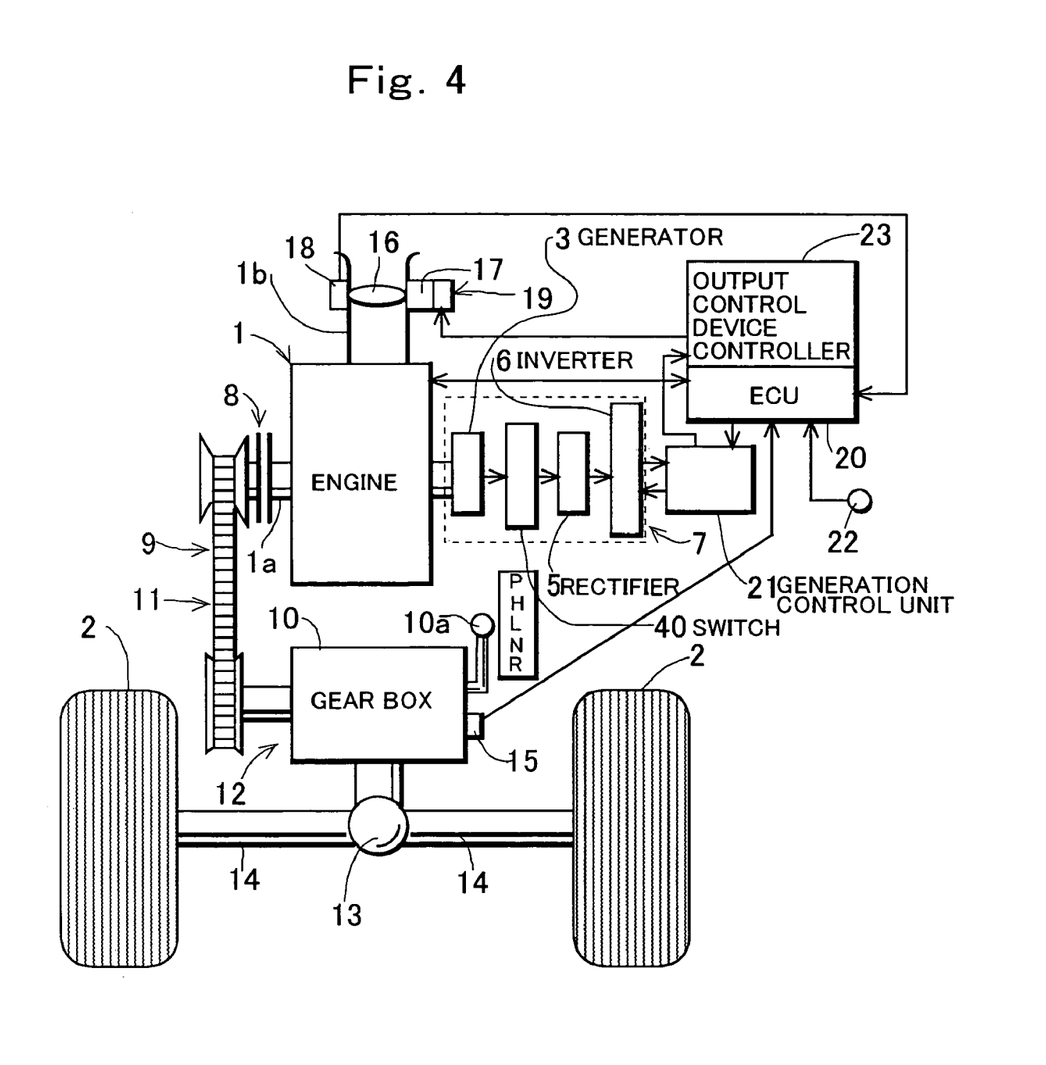
FIG. 4 is a schematic diagram of a construction of a vehicle to which a control device according to another embodiment of the invention is applied.

In the example in FIG. 4, a vehicle is comprised so as to always connect a crankshaft of an engine 1 and a rotational axis of a generator 3. A switch 40 that can control on/off including a relay or the like is inserted between an output terminal of the generator 3 and a circuit to which an output voltage of the generator is applied (a rectifier 5 in the shown example), and the switch 40 is turned off when there is a possibility of an excessive increase in the output voltage of the generator 3 while vehicle driving.

As shown in FIG. 4, when the switch 40 is inserted between the output terminal of the generator 3 and the circuit to which the output voltage of the generator is applied, a control device includes rotational speed control means for controlling a rotational speed of the engine to an upper limit value or lower accepted while driving when the vehicle is driven, and controlling the rotational speed of the engine to a rotational speed or lower slightly higher than an upper limit value of the rotational speed required for supplying power from the generator to an external load when the vehicle is stopped to supply power from the generator to the external load; and error occurrence time switch off means for turning off the switch 40 when an error occurs that may cause an excessive increase in output voltage of the generator. This prevents the excessive output voltage of the generator from being applied to a circuit closer to a load to protect the circuit when the rotational speed of the engine increases at the occurrence of an error.

In the above described example, in the error mode, a limit rotational speed in rotational speed limit control is set to a sufficiently low value such as an idling speed (a rotational speed at which the generator outputs few voltages or outputs voltages of sufficiently low values), or the limit rotational speed is set to zero to stop the engine. However, when the control device according to the invention is comprised so as to stop the engine in the error mode, the control device may include engine stop means for stopping the engine in some manner, and a processing for stopping the engine is not limited to setting the limit rotational speed in the rotational speed limit control to zero as in the above described example.

For example, an operation of ignition control means and an operation of injection control means are stopped in the error mode, and the engine may be stopped by stopping an ignition operation of the engine and stopping fuel injection.

In the above described embodiment, error detection means is comprised so as to detect as errors an abnormality of an output control device operated when an output of the engine is adjusted, an abnormality of a power supply unit, abnormalities of sensors that detect various control conditions used when engine control means controls the engine, and a condition where a power transmission device transmits power when a mode selection switch selects a control mode for generating electric power, but in the invention, all the abnormalities are not always required to be detected.

The error detection means may be comprised so as to detect as an error at least one of the abnormality of the output control device operated when the output of the engine is adjusted, the abnormality of the power supply unit, the abnormalities of the sensors that detect various control conditions used when the engine control means controls the engine, and the condition where the power transmission device transmits power when the mode selection switch selects the control mode for generating electric power.

The kinds of abnormalities to be detected as errors may be determined in accordance with uses of the vehicle, characteristics of the incorporated engine, characteristics of the generator, or the like.

In the above described example, a case where fuel is supplied to the engine by the fuel injection device is taken, but the invention may be applied to a case where fuel vaporized by a carburetor is supplied to the engine.

In the control device according to the invention, as shown in the embodiment, it is preferable to provide the error detection means to limit the rotational speed of the engine to the sufficiently low value or to stop the engine when the error is detected, but the control of limiting the rotational speed of the engine or the control of stopping the engine when the error is detected may be omitted.

As described above, according to the invention, the limit rotational speed switching means for switching the limit rotational speed in accordance with the control mode is provided, and the limit rotational speed when the engine is driven in the control mode for generating electric power is set to the rotational speed suitable for the control mode for generating electric power. Therefore, when the throttle valve is opened by a human during generation to increase the rotational speed of the engine, the rotational speed is prevented from exceeding the limit rotational speed to suitably protect the circuit connected to the generator.

In the invention, in the case where the error detection means is provided, and the control mode is set to the error mode to switch the limit rotational speed to the sufficiently low value when the error detection means detects the occurrence of the error, damages may be prevented including damage to the generator by high speed driving of the engine with the abnormality occurring, damage to the electronic components that constitute the power supply unit by an excessive output of the generator, or damage to the load connected to the power supply unit.

The constructions of the control device for the engine driven vehicle disclosed in the specification will be summarized as described below.

(1) A control device for an engine driven vehicle that includes an engine 1 provided for driving a vehicle body, and a generator 3 driven by the engine, and is comprised so as to supply power from the generator to an external load when driving is stopped, comprising: rotational speed limiting means for performing rotational speed limit control to limit a rotational speed of the engine 1 to a limit rotational speed or lower corresponding to an upper limit value accepted while driving when the vehicle is driven, and to limit the rotational speed of the engine 1 to a limit rotational speed or lower corresponding to a rotational speed slightly higher than an upper limit value of the rotational speed required for supplying power from the generator 3 to the external load when the vehicle is stopped to supply power from the generator 3 to the external load.

(2) A control device for an engine driven vehicle that includes an engine 1 provided for driving a vehicle body, and a generator 3 driven by the engine, and is comprised so as to supply power from the generator to an external load when driving is stopped, comprising: rotational speed limiting means for controlling to limit a rotational speed of the engine to a limit rotational speed or lower corresponding to an upper limit value accepted while driving when the vehicle is driven, to limit the rotational speed of the engine to a limit rotational speed or lower corresponding to a rotational speed slightly higher than an upper limit value of the rotational speed required for supplying power from the generator to the external load when the vehicle is stopped to supply power from the generator to the external load, and to limit the rotational speed of the engine to an upper limit value of the rotational speed accepted at the occurrence of an error when an error occurs that requires limiting the rotational speed of the generator.

(3) A control device for an engine driven vehicle that includes an engine 1 provided for driving a vehicle body, and a generator 3 driven by the engine, and is comprised so as to supply power from the generator to an external load when driving is stopped, comprising: rotational speed limiting means for controlling to limit a rotational speed of the engine to a limit rotational speed or lower corresponding to an upper limit value accepted while driving when the vehicle is driven, and to limit the rotational speed of the engine to a limit rotational speed or lower corresponding to a rotational speed slightly higher than an upper limit value of the rotational speed required for supplying power from the generator to the external load when the vehicle is stopped to supply power from the generator to the external load; and error occurrence time engine stop means for stopping the engine when an error occurs that requires limiting the rotational speed of the generator.

(4) A control device for an engine driven vehicle comprising: an engine 1 incorporated in a vehicle body with driving wheels 2 and having a crankshaft 1a connected to the driving wheels 2 via a power transmission device; a power supply unit 7 that has a generator 3 driven by the engine 1 and uses the generator as a power supply to supply power to an external load; engine control means (ECU 20) for performing control required for driving the engine, control for keeping a rotational speed of the engine to a target rotational speed, and rotational speed limit control for limiting the rotational speed of the engine to a limit rotational speed or lower; a mode selection switch 22 for selecting a control mode between a driving time control mode and a control mode for generating electric power; and generation control means 21 for controlling the power supply unit and determining a target rotational speed of the engine so as to generate a predetermined output from the power supply unit 7 when the mode selection switch 22 selects the control mode for generating electric power, wherein when the mode selection switch 22 selects the driving time control mode, the control mode is set to the driving time control mode to perform control required for driving the vehicle, and when the vehicle is stopped and the mode selection switch 22 selects the control mode for generating electric power, the control mode is set to the control mode for generating electric power to perform control required for supplying power from the power supply unit 7 to the external load, the control device further comprising limit rotational speed switching means 33 for switching the limit rotational speed in accordance with the control mode so that when the control mode is the driving time control mode, the limit rotational speed is set to a rotational speed corresponding to an upper limit value of the rotational speed of the engine accepted while vehicle driving, and when the control mode is the control mode for generating electric power, the limit rotational speed is set to a rotational speed slightly higher than an upper limit value of the rotational speed required for supplying power from the power supply unit to the external load.

(5) A control device for an engine driven vehicle comprising: an engine 1 incorporated in a vehicle body with driving wheels 2 and having a crankshaft 1a connected to the driving wheels 2 via a power transmission device; a power supply unit 7 that has a generator 3 driven by the engine 1 and uses the generator as a power supply to supply power to an external load; engine control means (ECU 20) for performing control required for driving the engine, control for keeping a rotational speed of the engine to a target rotational speed, and rotational speed limit control for limiting the rotational speed of the engine to a limit rotational speed or lower; a mode selection switch 22 for selecting a control mode between a driving time control mode and a control mode for generating electric power; and generation control means 21 for controlling the power supply unit and determining a target rotational speed of the engine so as to generate a predetermined output from the power supply unit 7 when the mode selection switch 22 selects the control mode for generating electric power, wherein when the mode selection switch 22 selects the driving time control mode, the control mode is set to the driving time control mode to perform control required for driving the vehicle, and when the vehicle is stopped and the mode selection switch 22 selects the control mode for generating electric power, the control mode is set to the control mode for generating electric power to perform control required for supplying power from the power supply unit 7 to the external load, the control device further comprising, error detection means for detecting as an error an abnormal condition that requires limiting the rotational speed of the generator 3; and limit rotational speed switching means for switching the limit rotational speed so that when the control mode is the driving time control mode, the limit rotational speed is set to a rotational speed corresponding to an upper limit value of the rotational speed of the engine 1 accepted while vehicle driving, when the control mode is the control mode for generating electric power, the limit rotational speed is set to a rotational speed slightly higher than an upper limit value of the rotational speed required for supplying power from the power supply unit 7 to the external load, and when the error detection means detects an error with the mode selection switch 22 selecting the control mode for generating electric power, the limit rotational speed is set to a rotational speed sufficiently lower than the limit rotational speed in the control mode for generating electric power or set to zero.

(6) A control device for an engine driven vehicle comprising: an engine 1 incorporated in a vehicle body with driving wheels 2 and having a crankshaft 1a connected to the driving wheels 2 via a power transmission device; a power supply unit 7 that has a generator 3 driven by the engine 1 and uses the generator as a power supply to supply power to an external load; engine control means (ECU 20) for performing control required for driving the engine, control for keeping a rotational speed of the engine to a target rotational speed, and rotational speed limit control for limiting the rotational speed of the engine to a limit rotational speed or lower; a mode selection switch 22 for selecting a control mode between a driving time control mode and a control mode for generating electric power; and generation control means 21 for controlling the power supply unit and determining a target rotational speed of the engine so as to generate a predetermined output from the power supply unit 7 when the mode selection switch 22 selects the control mode for generating electric power, wherein when the mode selection switch 22 selects the driving time control mode, the control mode is set to the driving time control mode to perform control required for driving the vehicle, and when the vehicle is stopped and the mode selection switch 22 selects the control mode for generating electric power, the control mode is set to the control mode for generating electric power to perform control required for supplying power from the power supply unit 7 to the external load, the control device further comprising: error detection means for detecting as an error an abnormal condition that requires limiting the rotational speed of the generator 3; limit rotational speed switching means for switching the limit rotational speed so that when the control mode is the driving time control mode, the limit rotational speed is set to a rotational speed corresponding to an upper limit value of the rotational speed of the engine accepted while vehicle driving, and when the control mode is the control mode for generating electric power, the limit rotational speed is set to a rotational speed slightly higher than an upper limit value of the rotational speed required for supplying power from the power supply unit 7 to the external load; and error occurrence time engine stop means for stopping the engine when the error detection means detects an error with the mode selection switch 22 selecting the control mode for generating electric power.

(7) A control device for an engine driven vehicle comprising: an engine 1 incorporated in a vehicle body with driving wheels 2 and having a crankshaft 1a connected to the driving wheels 2 via a power transmission device; a power supply unit 7 that has a generator 3 driven by the engine 1 and uses the generator as a power supply to supply power to an external load; engine control means (ECU 20) for performing control required for driving the engine, control for keeping a rotational speed of the engine to a target rotational speed, and rotational speed limit control for limiting the rotational speed of the engine to a limit rotational speed or lower; a mode selection switch 22 for selecting a control mode between a driving time control mode and a control mode for generating electric power; and generation control means 21 for controlling the power supply unit and determining a target rotational speed of the engine so as to generate a predetermined output from the power supply unit 7 when the mode selection switch 22 selects the control mode for generating electric power, wherein when the mode selection switch 22 selects the driving time control mode, the control mode is set to the driving time control mode to perform control required for driving the vehicle, and when the vehicle is stopped and the mode selection switch 22 selects the control mode for generating electric power, the control mode is set to the control mode for generating electric power to perform control required for supplying power from the power supply unit 7 to the external load, the control device further comprising: error detection means for detecting as an error an abnormal condition that requires limiting the rotational speed of the generator 3; mode setting means 28 for setting the control mode to the driving time control mode when the mode selection switch 22 selects the driving time control mode, setting the control mode to a shift mode for performing control in a process of shifting to the control mode for generating electric power when the mode selection switch selects the control mode for generating electric power, and the error detection means detects no error, setting the control mode to the control mode for generating electric power when completion of the shift mode is confirmed, and setting the control mode to the error mode when the error is detected with the mode selection switch selecting the control mode for generating electric power; and limit rotational speed switching means 33 for switching the limit rotational speed to a rotational speed suitable for each control mode in accordance with the control mode set by the mode setting means 28.

(8) The control device for an engine driven vehicle according to the above item 7, wherein the limit rotational speed switching means 33 is comprised so that when the control mode set by the mode setting means is the driving time control mode, the limit rotational speed is set to a rotational speed corresponding to an upper limit value of the rotational speed of the engine accepted while vehicle driving, when the control mode set by the mode setting means is the shift mode, the limit rotational speed is set to a rotational speed slightly higher than an initial rotational speed, when the control mode set by the mode setting means is the control mode for generating electric power, the limit rotational speed is set to a rotational speed slightly higher than an upper limit value of the rotational speed required when power is supplied from the power supply unit to the external load, and when the control mode set by the mode setting means is the error mode, the limit rotational speed is set to a rotational speed sufficiently lower than the limit rotational speed in the control mode for generating electric power or set to zero.

(9) A control device for an engine driven vehicle comprising: an engine 1 incorporated in a vehicle body with driving wheels 2 and having a crankshaft 1a connected to the driving wheels 2 via a power transmission device; a power supply unit 7 that has a generator 3 driven by the engine 1 and uses the generator as a power supply to supply power to an external load; engine control means (ECU 20) for performing control required for driving the engine, control for keeping a rotational speed of the engine to a target rotational speed, and rotational speed limit control for limiting the rotational speed of the engine to a limit rotational speed or lower; a mode selection switch 22 for selecting a control mode between a driving time control mode and a control mode for generating electric power; and generation control means 21 for controlling the power supply unit and determining a target rotational speed of the engine so as to generate a predetermined output from the power supply unit 7 when the mode selection switch 22 selects the control mode for generating electric power, wherein when the mode selection switch 22 selects the driving time control mode, the control mode is set to the driving time control mode to perform control required for driving the vehicle, and when the vehicle is stopped and the mode selection switch 22 selects the control mode for generating electric power, the control mode is set to the control mode for generating electric power to perform control required for supplying power from the power supply unit 7 to the external load, the control device further comprising: error detection means for detecting as an error an abnormal condition that requires limiting the rotational speed of the generator 3; mode setting means 28 for setting the control mode to the driving time control mode when the mode selection switch 22 selects the driving time control mode, setting the control mode to a shift mode for performing control in a process of shifting to the control mode for generating electric power when the mode selection switch selects the control mode for generating electric power, and the error detection means detects no error, setting the control mode to the control mode for generating electric power when completion of the shift mode is confirmed, and setting the control mode to the error mode when the error is detected with the mode selection switch selecting the control mode for generating electric power; limit rotational speed switching means 33 for switching the limit rotational speed to a rotational speed suitable for each control mode when the control mode set by the mode setting means is the driving time control mode and the control mode for generating electric power; and engine stop means for stopping the engine when the control mode set by the mode setting means is the error mode.

(10) The control device for an engine driven vehicle according to the above item 9, wherein the limit rotational speed switching means 33 is comprised so that when the control mode set by the mode setting means 28 is the driving time control mode, the limit rotational speed is set to a rotational speed corresponding to an upper limit value of the rotational speed of the engine accepted while vehicle driving, when the control mode set by the mode setting means 28 is the shift mode, the limit rotational speed is set to a rotational speed slightly higher than an initial rotational speed, and when the control mode set by the mode setting means 28 is the control mode for generating electric power, the limit rotational speed is set to a rotational speed slightly higher than an upper limit value of the rotational speed required when power is supplied from the power supply unit to the external load.

(11) The control device for an engine driven vehicle according to the above items 3, 5, 6, 7, 8, 9 or 10, wherein the error detection means is comprised so as to detect as an error at least one of an abnormality of an output control device operated when an output of the engine is adjusted, an abnormality of the power supply unit, abnormalities of sensors that detect various control conditions used when the engine control means controls the engine, and a condition where a power transmission device transmits power when the mode selection switch selects the control mode for generating electric power.

(12) The control device for an engine driven vehicle according to the above items 3, 5, 6, 7, 8, 9, 10 or 11, wherein a synchronous generator of a field control type constitutes the generator 3, and the generation control means 21 comprises target rotational speed setting means for providing a rotational speed required for matching an output frequency of the generator with a target value as a target rotational speed, and field control means for controlling a field of the generator so as to generate a predetermined output from the generator.

(13) The control device for an engine driven vehicle according to the above items 3, 5, 6, 7, 8, 9, 10 or 11, wherein the power supply unit comprises a rectifier that rectifies and converts an AC output of the generator into an DC output, and an inverter that converts the DC output of the rectifier into an AC output at a fixed frequency and provides the AC output to the external load, and the generation control means comprises inverter control means for controlling the inverter so as to output an AC output at a predetermined frequency from the inverter, and target rotational speed setting means for providing a rotational speed required for generating a desired output from the inverter as a target rotational speed, when the control mode set by the mode setting means is the control mode for generating electric power.

(14) The control device for an engine driven vehicle according to any of the above items 1 to 13, wherein a switch that is turned off when the vehicle is driven and turned on when the generator is driven is inserted between an output terminal of the generator and a circuit to which an output voltage of the generator is applied.

(15) The control device for an engine driven vehicle according to any of the above items 1 to 14, wherein a clutch that is turned off when the vehicle is driven and turned on when the generator is driven is provided between the crankshaft and a rotational axis of the generator.

(16) A control device for an engine driven vehicle that includes an engine provided for driving a vehicle body, and a generator driven by the engine, and is comprised so as to supply power from the generator to an external load when driving is stopped, comprising: a clutch inserted between a crankshaft of the engine and a rotational axis of the generator; rotational speed limiting means for limiting a rotational speed of the engine to an upper limit value or lower accepted while driving when the vehicle is driven, and limiting the rotational speed of the engine to a rotational speed or lower slightly higher than an upper limit value of the rotational speed required for supplying power from the generator to the external load when the vehicle is stopped to supply power from the generator to the external load; and error occurrence time clutch off means for turning off the clutch when an error occurs that requires stopping the generator.

(17) A control device for an engine driven vehicle that includes an engine provided for driving a vehicle body, and a generator driven by the engine, and is comprised so as to supply power from the generator to an external load when driving is stopped, comprising: a switch inserted between an output terminal of the generator and a circuit to which an output voltage of the generator is applied; rotational speed limiting means for limiting a rotational speed of the engine to an upper limit value or lower accepted while driving when the vehicle is driven, and limiting the rotational speed of the engine to a rotational speed or lower slightly higher than an upper limit of the rotational speed required for supplying power from the generator to the external load when the vehicle is stopped to supply power from the generator to the external load; and error occurrence time switch off means for turning off the switch when an error occurs that may cause an excessive increase in the output voltage of the generator.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A control device for an engine driven vehicle that includes an engine provided for driving a vehicle body, and a generator driven by said engine, and is comprised so as to supply power from said generator to an external load when driving is stopped, comprising:

rotational speed limiting means for controlling to limit a rotational speed of said engine so as to limit the rotational speed of said engine to a limit rotational speed or lower corresponding to an upper limit value accepted while driving when said vehicle is driven, and to limit the rotational speed of said engine to a limit rotational speed or lower corresponding to a rotational speed slightly higher than an upper limit value of the rotational speed required for supplying power from said generator to the external load when said vehicle is stopped to supply power from said generator to the external load.

2. A control device for an engine driven vehicle that includes an engine provided for driving a vehicle body, and a generator driven by said engine, and is comprised so as to supply power from said generator to an external load when driving is stopped, comprising:

rotational speed limiting means for controlling to limit a rotational speed of said engine to a limit rotational speed or lower corresponding to an upper limit value accepted while driving when said vehicle is driven, to limit the rotational speed of said engine to a limit rotational speed or lower corresponding to a rotational speed slightly higher than an upper limit value of the rotational speed required for supplying power from said generator to the external load when said vehicle is stopped to supply power from said generator to the external load, and to limit the rotational speed of said engine to an upper limit value of the rotational speed accepted at the occurrence of an error when an error occurs that requires limiting the rotational speed of said generator.

3. A control device for an engine driven vehicle that includes an engine provided for driving a vehicle body, and a generator driven by said engine, and is comprised so as to supply power from said generator to an external load when driving is stopped, comprising:

rotational speed limiting means for controlling to limit a rotational speed of said engine to a limit rotational speed or lower corresponding to an upper limit value accepted while driving when said vehicle is driven, and to limit the rotational speed of said engine to a limit rotational speed or lower corresponding to a rotational speed slightly higher than an upper limit value of the rotational speed required for supplying power from said generator to the external load when said vehicle is stopped to supply power from said generator to the external load; and error occurrence time engine stop means for stopping said engine when an error occurs that requires limiting the rotational speed of said generator.

* * * * *